(12) United States Patent
Couvee et al.

(10) Patent No.: US 8,990,451 B2
(45) Date of Patent: Mar. 24, 2015

(54) CONTROLLER FOR DIRECT ACCESS TO A MEMORY FOR THE DIRECT TRANSFER OF DATA BETWEEN MEMORIES OF SEVERAL PERIPHERAL DEVICES, METHOD AND COMPUTER PROGRAM ENABLING THE IMPLEMENTATION OF SUCH A CONTROLLER

(75) Inventors: Philippe Couvee, Villard Bonnot (FR); Jean-Vincent Ficet, La Chapelle Blanche (FR); Yann Kalemkarian, Grenoble (FR)

(73) Assignee: Bull SAS, Les Clayes Sous Bois (FR)

( * ) Notice: Subject to any disclaimer, the term of this patent is extended or adjusted under 35 U.S.C. 154(b) by 96 days.

(21) Appl. No.: 13/513,092

(22) PCT Filed: Nov. 24, 2010

(86) PCT No.: PCT/FR2010/052500
§ 371 (c)(1),
(2), (4) Date: May 31, 2012

(87) PCT Pub. No.: WO2011/070262
PCT Pub. Date: Jun. 16, 2011

(65) Prior Publication Data
US 2012/0260005 A1 Oct. 11, 2012

(30) Foreign Application Priority Data

Dec. 1, 2009 (FR) ...................................... 09 05776

(51) Int. Cl.
*G06F 13/28* (2006.01)
(52) U.S. Cl.
CPC ...................................... *G06F 13/28* (2013.01)
USPC .......................................................... 710/22
(58) Field of Classification Search
None
See application file for complete search history.

(56) References Cited

U.S. PATENT DOCUMENTS 7,028,120 B2 * 4/2006 Hu et al. ........................ 710/240
2005/0160200 A1 * 7/2005 Saito ............................... 710/22

(Continued)

FOREIGN PATENT DOCUMENTS

EP 1 313 023 5/2003
EP 1557764 7/2005

(Continued)

OTHER PUBLICATIONS

PCT International Search Report for PCT Application No. PCT/FR2010/052500, mailed Mar. 30, 2011.

(Continued)

*Primary Examiner* — Idriss N Alrobaye
*Assistant Examiner* — David Martinez
(74) *Attorney, Agent, or Firm* — Knobbe Martens Olson & Bear, LLP

(57) ABSTRACT

The subject of the invention is in particular the direct transfer of data between first and second peripherals connected via a communication bus. For this purpose, the first peripheral comprises a controller for direct access to a memory having means (425) for initiating at least one command for direct access to a region of a memory external to said first peripheral and means (400) for receiving at least one command for direct access to a region of a memory of said first peripheral, said command being received from said at least one second peripheral, and means (415) for transmitting said at least one received direct access command to a component of said first peripheral. The controller thus allows a controller of direct access to a memory of said at least one second peripheral to carry out a direct transfer of at least one data item to or from a memory of said first peripheral from or to said second peripheral.

8 Claims, 4 Drawing Sheets

(56) References Cited

U.S. PATENT DOCUMENTS

| | | |
|---|---|---|
| 2008/0104341 A1 | 5/2008 | Ihara et al. |
| 2008/0147906 A1 | 6/2008 | Hamamura |
| 2009/0248903 A1 | 10/2009 | Nishita et al. |

FOREIGN PATENT DOCUMENTS

| | | |
|---|---|---|
| JP | 2002-207363 A | 8/1990 |
| JP | 2004-257049 A | 9/1992 |
| JP | 2005-078598 A | 3/2005 |
| JP | 2008-146541 A | 12/2006 |
| JP | 2009-259209 A | 12/2008 |
| WO | WO 2006/114822 A1 | 11/2006 |
| WO | WO 2009/077341 | 6/2009 |
| WO | WO 2009/123933 A1 | 10/2009 |

OTHER PUBLICATIONS

Notice of Rejection entered in Japanese Patent Application No. 2012-541555, mailing date Nov. 26, 2013.

\* cited by examiner

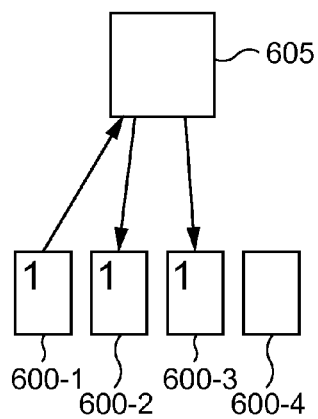
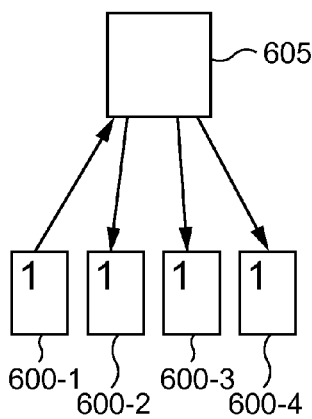
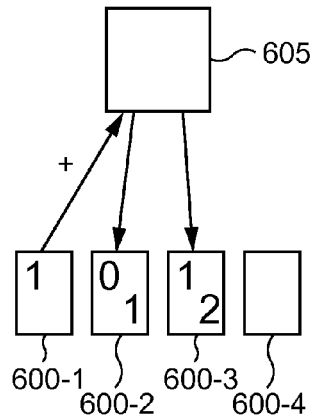
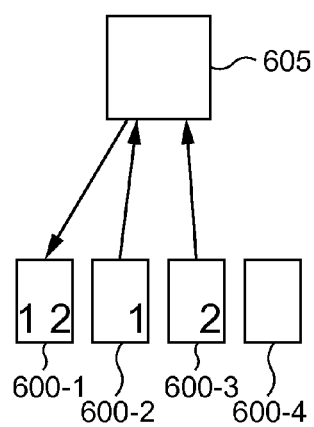
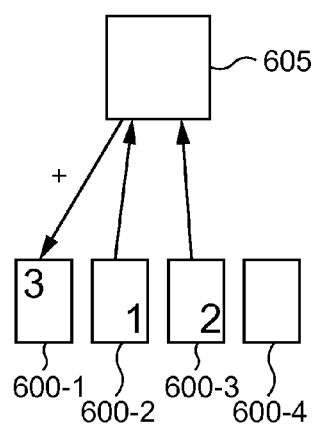
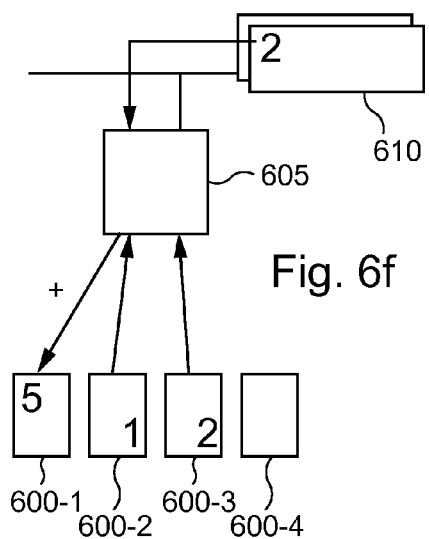
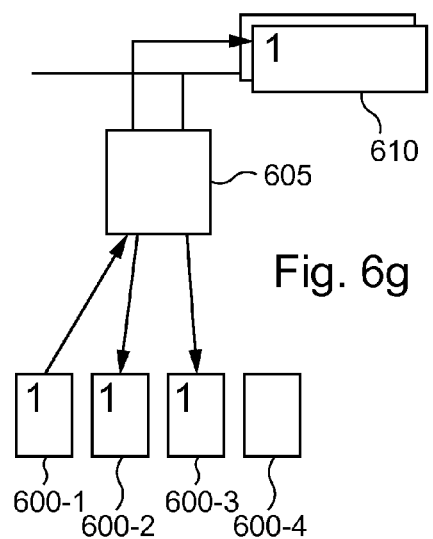

CONTROLLER FOR DIRECT ACCESS TO A MEMORY FOR THE DIRECT TRANSFER OF DATA BETWEEN MEMORIES OF SEVERAL PERIPHERAL DEVICES, METHOD AND COMPUTER PROGRAM ENABLING THE IMPLEMENTATION OF SUCH A CONTROLLER

CROSS-REFERENCE TO RELATED APPLICATIONS

This application is a U.S. National Phase under 35 U.S.C. §371 of International Application PCT/FR2010/052500, filed Nov. 24, 2010, which designated the U.S., and which claims priority under 35 U.S.C. §119 to French Patent Application Number 0905776, filed on Dec. 1, 2009. The disclosures of the above-described applications are hereby expressly incorporated by reference in their entireties.

The present invention concerns the transfer of data between at least some areas of memories of a computer system and more particularly a controller for direct access to a memory enabling the direct transfer of data between memories of several peripheral devices as well as a method and a computer program enabling the implementation of such a controller.

Modern computer systems frequently integrate mechanisms for direct access to a central memory by input/output systems also called peripheral devices. These mechanisms are commonly called DMA type controllers (DMA standing for Direct Memory Access).

According to this data sending mechanism, a peripheral device such as a network card or a hard disk interface may itself perform a data transfer between an internal memory of that device and a central memory situated externally to it, without intervention by the processor or processors, these latter merely sending a reading or writing command comprising a start address of the memory area to transfer and the length of that area. The data transfer may be carried out from an internal memory to an external memory and vice-versa.

DMA type controllers are in particular used in multitask computer systems using fast peripheral devices in order not to lead to blockage during the data transfers. They behave like initiators of reading or writing requests for transferring data from an internal memory of a peripheral device to a central memory and vice-versa.

Furthermore, DMA type controllers make it possible to protect the internal memory of a peripheral device by preventing direct access thereto.

Figure 1:
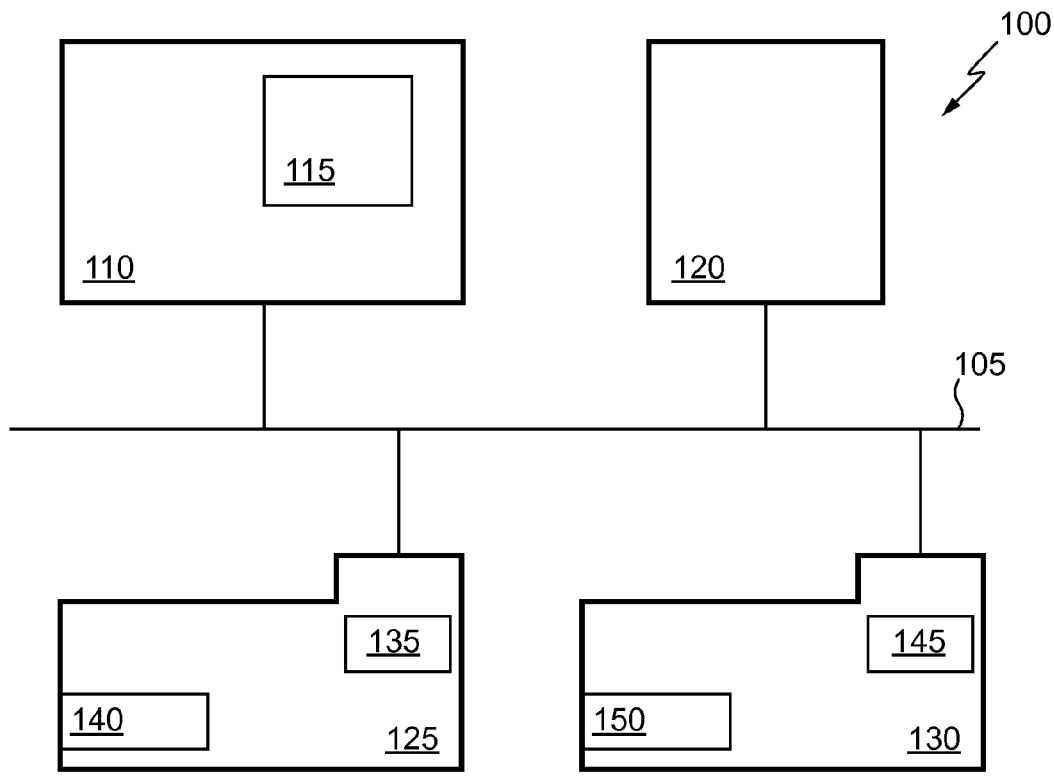

FIG. 1 diagrammatically illustrates a computer system comprising two peripheral devices each equipped with a DMA type controller.

As illustrated, the computer system 100 comprises an input/output bus 105 to which are connected a mother board 110 integrating one or more processors 115, a central memory 120 and network cards 125 and 130. Although their illustration is simplified in FIG. 1, the computer system 100 comprises not only the hardware components represented but also software applications such as firmware enabling the implementation of the system. The network card 125 comprises a DMA type controller 135 enabling data to be exchanged between the central memory 120 and the network interface 140 via the bus 105. Similarly, the network card 130 comprises a DMA type controller 145 enabling data to be exchanged between the central memory 120 and the interface 150 via the bus 105.

Thus, for example, when the network interface 140 receives data from the network, the DMA type controller 135 initiates a request to write in the memory 120 to transfer thereto the received data stored locally in a buffer memory (not represented). Similarly, when the DMA type controller 135 receives a reading request from a processor 115 to send data via the network, it initiates a reading request to read data in the memory 120 and transfer them to the interface 140.

In the same way, the DMA type controller 145 enables data to be exchanged between the memory 120 and a network to which the card 130 is connected.

However, whereas the DMA type controllers have proved their effectiveness in numerous architectures, there is a continuous need to improve the performance of computer systems, in particular HPC type computer systems (HPC standing for High-performance computing).

An object of the invention is thus, in particular, to improve the controllers for direct access to a memory to enable the direct transfer of data between memories of several peripheral devices.

The invention thus relates to a controller for direct access to a memory for a peripheral device, referred to as first peripheral device, it being possible for said first peripheral device to be connected to at least one other peripheral device, called second peripheral device, via a communication bus, the controller comprising the following means,
   means for initiating at least one command for direct access to an area of a memory external to said first peripheral device;
   means for receiving at least one command for direct access to an area of a memory of said first peripheral device, said command being received from said at least one second peripheral device; and,
   means for sending said at least one received direct access command to a component of said first peripheral device,
said controller enabling a controller for direct access to a memory of said at least one second peripheral device to perform a direct transfer of at least one item of data to or from a memory of said first peripheral device from or to said at least one second peripheral device.

The controller according to the invention thus authorizes direct transfers of data to be made between memories of peripheral devices of a computer system which in particular make it possible to reduce the quantity of central memory used in the computer system, to free the central processor of certain data transfer tasks and to reduce the latency due to the reading/writing operations.

Advantageously, the controller furthermore comprises means for checking the validity of said at least one received direct access command in order to protect the memory of that device against unauthorized access.

According to a particular embodiment, said checking means comprise means for comparing an identifier of the sender of said at least one direct access command with at least one predetermined identifier. Thus, only the authorized peripheral devices can directly access a memory of a given peripheral device.

Still according to a particular embodiment, said checking means comprise means for comparing said area of a memory of said first peripheral device with at least one predetermined memory area. Thus, it is possible to protect areas of memory of a peripheral device in order that none or only some peripheral devices can have access thereto.

The controller further comprises, preferably, means for identifying said at least one second peripheral device and means for sending a command for direct access to an area of said second device when the memory concerned by the direct access command coming from said initiating means belongs to said at least one second peripheral device. The first device may thus initiate a direct access to a memory of said at least one second device.

The invention also relates to a method of implementing the controller described above, the method comprising the following steps,
- registering said first peripheral device such that said first peripheral device can be identified by another peripheral device linked to said first peripheral device via said communication bus;
- receiving at least one command for direct access to an area of a memory of said first peripheral device, said command being received from said at least one second peripheral device; and,
- sending said at least one received direct access command to a component of said first peripheral device, to enable a controller for direct access to a memory of said at least one second peripheral device to perform a direct transfer of at least one item of data to or from a memory of said first peripheral device from or to said at least one second peripheral device.

Said first peripheral device may thus be identified by said at least one second peripheral device which may then initiate a direct transfer of data between a memory of said first peripheral device and a memory of said at least one second peripheral device.

Advantageously, the method further comprises a step of declaring at least one area of a memory of said first peripheral device accessible by said at least one second peripheral device to enable the latter to initiate a direct transfer to or from said at least one area.

The method further comprises, preferably, a step of configuring said first peripheral device, said configuring step comprising at least the definition of a rule for access to an area of a memory of first said peripheral device in order in particular to protect that area.

Still according to a particular embodiment, the method further comprises a step of controlling said first peripheral device, said controlling step enabling a user to modify at least one parameter of said first peripheral device to control a direct transfer of at least one item of data to or from a memory of said first peripheral device from or to said at least one second peripheral device.

The present invention also relates to a computer program comprising instructions adapted for the implementation of each of the steps of the method described earlier when said program is executed on a computer. The advantages procured by that computer program are similar to those referred to above.

Figure 3:
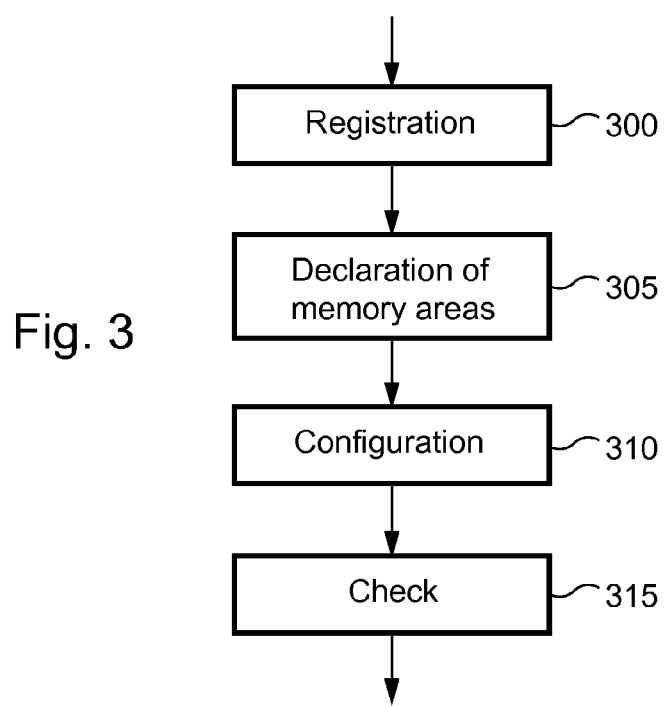
Figure 2:
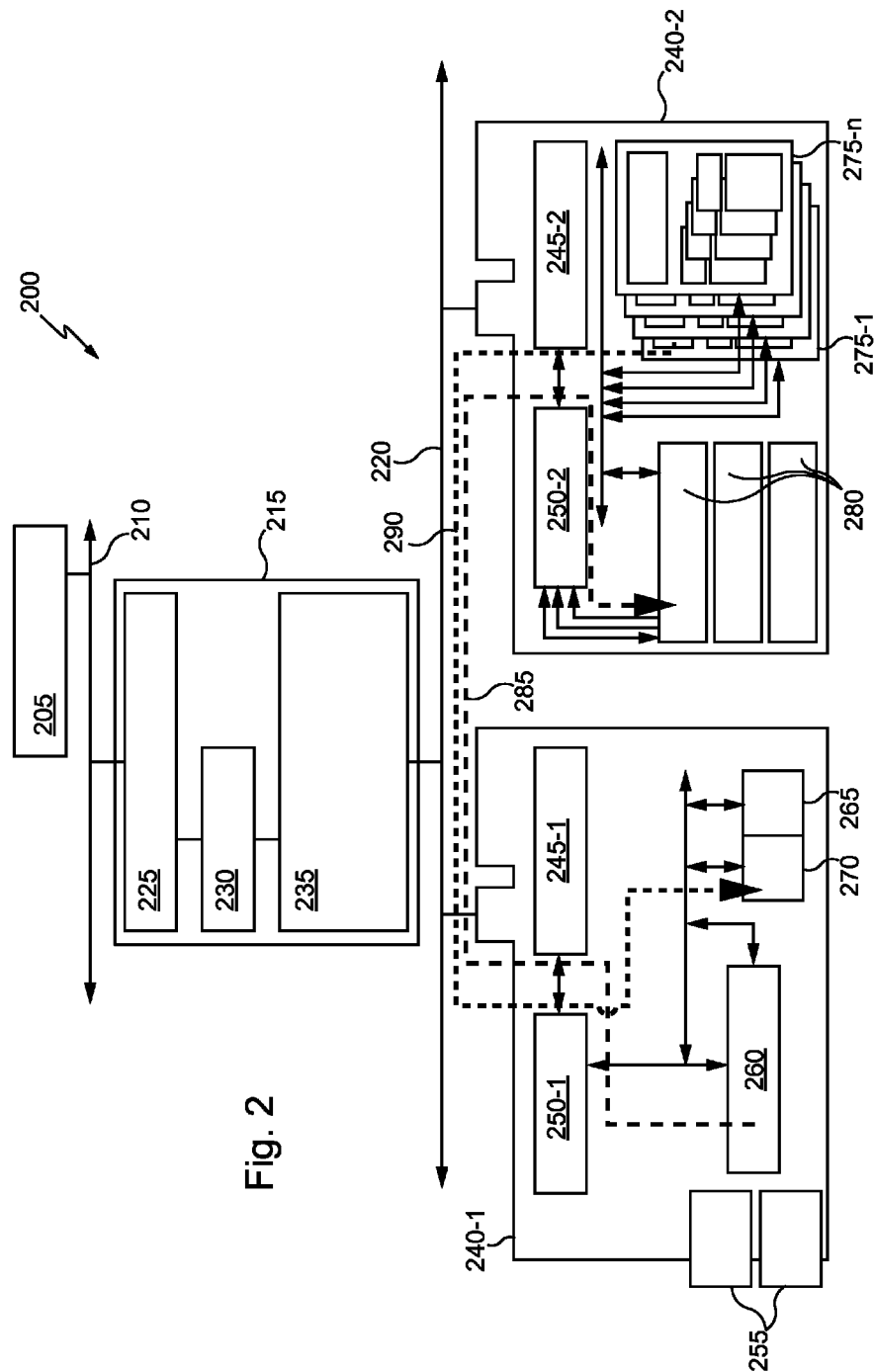
Figure 4:
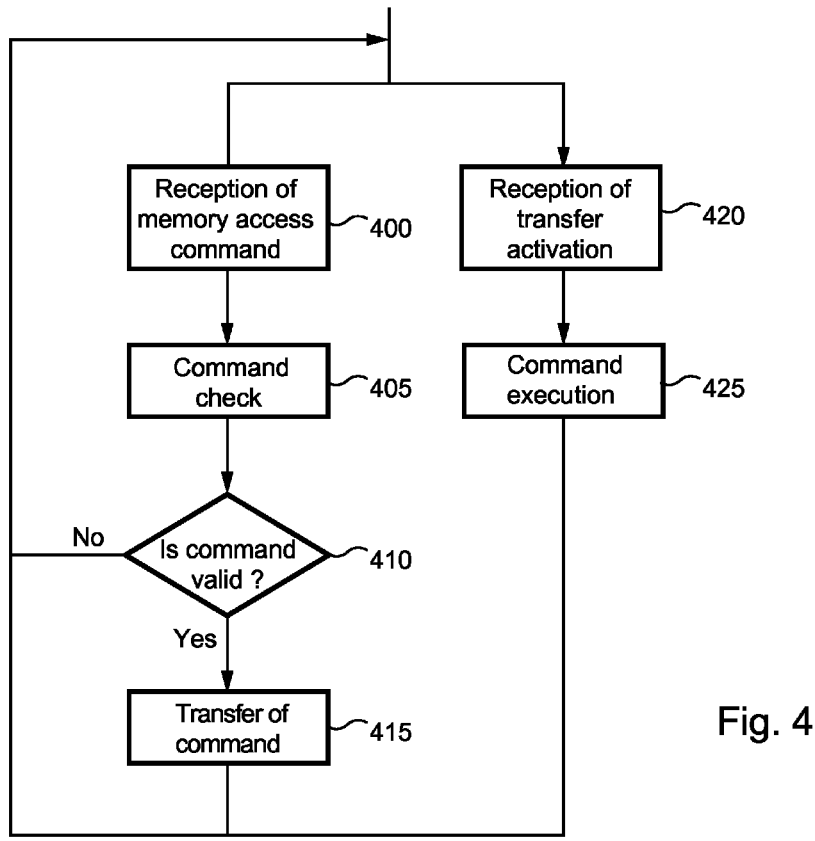

Other advantages, objects and features of the present invention will emerge from the following detailed description, given by way of non-limiting example, relative to the accompanying drawings in which:

FIG. 1 diagrammatically illustrates a computer system comprising two peripheral devices each equipped with a DMA type controller;

FIG. 2 diagrammatically illustrates certain components of a computer system in which the invention may be implemented;

FIG. 3 diagrammatically illustrates phases executed in a DMA type controller of a particular peripheral device to enable the direct transfer of data between peripheral devices;

FIG. 4 diagrammatically illustrates certain steps executed in a DMA type controller conforming to the invention to directly transfer data between several peripheral devices.

Figure 5:
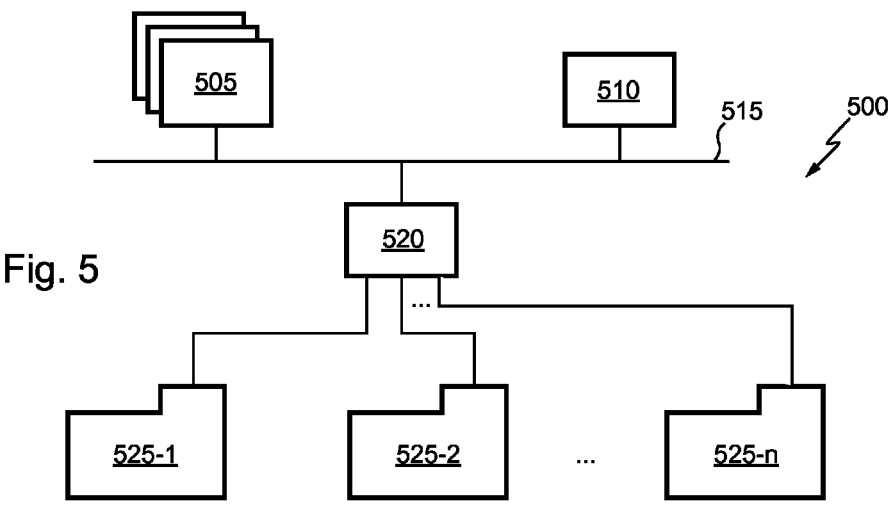

FIG. 5 illustrates a computer system adapted to implement data transfers in multipoint mode; and, FIG. 6, comprising FIGS. 6a to 6g presents examples of direct sending of data between several peripheral devices, during which operations may be carried out on the transferred data.

In general terms, the invention is directed to enabling the direct sending of data between memories of peripheral devices provided with DMA type controllers without necessitating steps of writing followed by steps of reading in a central memory. In other words, the invention enables the implementation of a mechanism for dialog between DMA type controllers enabling them to platform transactions for which a DMA type controller is the initiator and at least one other DMA type controller behaves as a target while performing the final part of the data transfer into the peripheral device considered.

Thus, by way of illustration and with reference to FIG. 1, data received by the network interface 140 of the network card 125 may be directly transferred into the interface 150 of the card 130 without using the central memory 120.

A direct communication between several peripheral devices has numerous advantages in particular in the context of high performance scientific computation, especially between graphics cards or GPUs (standing for Graphics Processing Units) and Infiniband cards, between Infiniband cards and Ethernet cards and between Infiniband cards.

In particular, it is observed that an increasing number of computing centers use graphics cards in order to perform computations which were conventionally carried out by computing units of the nodes, the greater power of the graphics cards making it possible to reduce the physical footprint of the system. In order to perform the computations in parallel, an interconnection network is required. By enabling a direct transfer of the data from the network to graphics cards and vice-versa, without requiring central memory, the nodes implemented require less memory, which makes it possible to reduce the electrical consumption while reducing the overall cost of the computer. The same applies to the transfer of data between internal and external networks. Furthermore, the direct transfer of data enables frequently encountered problems of non-uniform memory access and of location to be overcome.

The implementation of the invention is linked, in particular, to the architecture of the transfer buses used between the peripheral devices and to the memory architecture of the different devices involved. It may be made at the level of the hardware or at the level of the software embedded in the device, preferably using a predetermined protocol which, advantageously, enables the following functions to be implemented,
- the identification of a peripheral device comprising a DMA type controller capable of initiating a direct transfer of data between DMA type controllers and of behaving like a target to perform the final part of a data transfer;
- the declaration of memory areas that can be used for directly transferring data between DMA type controllers, that is to say from memory areas controlled by a DMA type controller and that are accessible by other DMA type controllers;
- the definition of rules for data transfer from a memory of a peripheral device comprising a DMA type controller capable of implementing the invention to other similar ones, in particular rules for direct or programmed data transfers; and,
- the control of peripheral devices comprising a DMA type controller capable of implementing the invention to make it possible to automate the transfer of data stored in a memory of such a device to other similar ones.

FIG. 2 diagrammatically illustrates certain components of a computer system 200 in which the invention may be implemented. The system comprises here a central memory 205 linked to a system bus 210 called host CPU to which is also linked the bus controller 215. A particular object of the latter is to convert and transfer information from the system bus 210 to a peripheral bus 220. For these purposes, the bus controller 215 comprises a system bus interface 225 a data interface 230 and a peripheral bus interface 235.

The computer system 200 further comprises two peripheral devices 240-1 and 240-2 connected to the peripheral bus 220.

The peripheral device 240-1 here is a network card, for example an Ethernet card. It comprises a peripheral bus interface 245-1 and an associated processing unit 250-1 for processing the data packets exchanged via that peripheral bus interface. It further comprises a network interface 255 and an associated processing unit 260 for processing the data packets exchanged via that network interface. Furthermore, the peripheral device 240-1 comprises a central processing unit (or CPU) 265 and a local memory 270, for example of SRAM type (SRAM being an acronym for Static Random Access Memory).

Similarly, the peripheral device 240-2, here a graphics card, comprises a peripheral bus interface 245-2 and an associated processing unit 250-2 for processing the data packets exchanged via that peripheral bus interface. This device further comprises a plurality of computing units 275-1 to 275-*n* each comprising a shared memory, a local memory and an elementary computing unit. This device also comprises memories 280 common to all the computing units, for example a general memory and a texture memory.

The interfaces 245-1 and 245-2 integrate a DMA type controller enabling direct data transfers between the central memory 205 via the bus controller 215 and an internal memory of the peripheral devices 240-1 and 240-2 and vice-versa.

These DMA type controllers furthermore integrate functions enabling data to be directly transferred between internal memories of those devices. By way of illustration, it is possible to transfer data from a buffer memory of the processing unit 260 of the device 240-1 to a memory 280 of the device 240-2 as illustrated by the arrow 285. Similarly, it is possible to transfer data from a shared memory of a computing unit 275-*i* of the device 240-2 to the local memory 270 of the device 240-1 as illustrated by the arrow 290.

For these purposes and as described earlier, the DMA type controllers here comprise functions for identification, declaration, configuration and controlling.

FIG. 3 diagrammatically illustrates an example of sequencing of the phases implemented in such a DMA type controller of a particular peripheral device. It is noted here that the phases represented in FIG. 3 are not necessarily executed sequentially and that they may be executed in a different order to that represented. In particular, the controlling phase may follow the registration phase.

An object of a first phase (phase 300) is the registration of the peripheral device in order for it to be identifiable by the other devices which are directly linked to it. This registration may, for example, be carried out in a common directory. This phase may in particular be automatically executed when the device is activated. The registration phase further comprises, preferably, a step of describing the device in particular in order to define the type thereof. It is noted here that the type may be defined in similar manner to the typology implemented in the PCI-E standard (PCI-E standing for Peripheral Component Interconnect Express). This description may also define other features specific to the peripheral device, in particular the following features given by way of illustration, an internal memory capacity of the device;

a credit to control a data stream in order to avoid unnecessary traffic (the sending of each command for access to an external memory uses one unit of credit which is again available when an acknowledgement of receipt is received in response to the command);

an indication of security to protect the access to the data of an internal memory of the device, when writing and/or when reading, for example based on a coding key mechanism;

an indication of integrity checking to specify whether the data exchanged comprise check data such as CRC data (CRC standing for Cyclic Redundancy Check).

a speed of consumption of the data stored in an internal memory of the device. This indication makes it possible in particular to verify the compatibility of two peripheral devices implementing DMA type controllers implementing the invention; and, the list of the operations supported by the device.

This phase may also be used to identify other peripheral devices linked to the same bus as the device considered, in particular devices comprising a DMA type controller in accordance with the invention, in order to establish the list of the peripheral devices with which the device considered may directly exchange data.

After having registered itself, the DMA controller of the device may initiate a memory area declaring phase (phase 305). A function implemented in this phase is directed in particular to the declaration of the internal memory areas of the device in which other devices may read and/or write data, which may be subject to certain conditions. Advantageously, such a declaration is made in the common directory used to identify the peripheral devices linked to the same bus.

During this phase, it is also possible to implement functions of the DMA type controller to search in a common directory for the sections of memory declared in advance by other peripheral devices. Furthermore, tools making it possible to establish relationships between internal memory areas of the device and internal memory areas of other devices may be implemented to establish source/destination links.

In a following phase (phase 310), the device may be configured to enable the direct transfer of data to or from other peripheral devices, that is to say to set data transfer rules. During this phase, an evaluation step is advantageously implemented in a test period to evaluate the compatibility, in particular in terms of services and speed, of the device considered with other peripheral devices which are linked to it.

This phase is also directed to creating primitives for transfer in point-to-point mode by specifying the devices implemented, the memory areas concerned and the possible data sending parameters such as security and integrity checking. It is noted here that an object of creating primitives is the definition of read and/or write commands but not their execution which is carried out when conditions are satisfied for example when an item of data is written in internal memory or on request of a user or an application.

By way of illustration, such a primitive may, with reference to the device 240-2 of FIG. 2, be directed to a command for writing data coming from a shared memory of a computing unit 275-*i* to the local memory 270 of the device 240-1 (arrow 290). It may also be a command for reading data from a buffer memory of the processing unit 260 of the device 240-1 to a memory 280 (arrow 285).

By way of illustration, they may be represented in the following form, reading(source, destination, length, parameters)

in which the indications of source and of destination comprise the identifiers of the peripheral devices and of the memories considered as well as the memory areas concerned, the length indicates the quantity of data to transfer and the parameters concern the parameters to be used which are linked, for example, to security, to the checking of data and to the execution of the command corresponding to the primitive.

Primitives may also be created for the sending of data in a collective mode of multicast or broadcast type which enables data to be transferred from a common source to several different devices as described below, in particular with reference to FIG. 6. Such a transfer mode is particularly useful when devices are duplicated to increase the reliability of the computer system.

They may also comprise operations of grouping or ungrouping of data coming from or destined for memories of several peripheral devices making it possible to improve the performance of the computer system. Such operations may be considered as extensions of the operations known under the name of scatter and gather whereby DMA type controllers are capable of grouping data from a memory to make a single exchange of a large amount of data.

The execution of the commands corresponding to those primitives may be explicit (according to the commands by users or from the kernel of the operating system), may be predetermined according to events (for example an item of data may be the subject of a writing command when it is received in memory), or may be periodic (the transfers are planned, that is to say that the content of the memory is transferred, in whole or in part, according to predetermined time cycles).

Lastly, a controlling phase may be implemented (phase 315) to enable a user to access the peripheral device. This access is, preferably, performed via an interface. It makes it possible here to obtain the version and the capabilities of a device as well as to configure it. It also makes it possible to declare areas of an internal memory of the device that are accessible to other devices and/or to define rules about such memory areas to indicate, for example, who may access those areas and with what operations and using what transfer modes.

FIG. 4 diagrammatically illustrates certain steps implemented in a DMA type controller conforming to the invention to directly transfer data between several peripheral devices.

After having received a command for access to an internal memory of the device comprising the DMA type controller (step 400), for example a command for reading or writing, a check of the received command is, preferably, performed (step 405). Such a check is in particular to protect the internal memory of the device that received the command. As stated earlier, such a check may in particular concern the initiator of the command and the memory area which is the subject of the command. A test is then carried out (step 410) to determine whether the command is valid, that is to say here whether the initiator of the command has the right to access the internal memory of the device that received the command and more particularly the memory area specified in the command.

If the command is not valid, the command is rejected. An error message may then be sent to the initiator of the request (not shown). If, on the contrary, the command is valid, it is sent to another component of the device comprising the DMA type controller that received the command (step 415), typically a memory controller. The command is then executed in standard manner.

In parallel, when the DMA type controller receives a notification of activation of data transfer (step 420), it executes the corresponding command in standard manner. The data transfer activation notification may be received from a component of the device comprising the DMA controller, for example a network interface, or from an external component, in particular processors of the central system of the computer system. It is noted that the transfer may here concern a command for reading or writing from or to the central memory of the computer system but also from or to one or more peripheral devices which then implement steps similar to steps 400 to 415 described earlier.

In other words, the DMA type controller here has a twin function of conventional DMA type controller (steps 420 and 425) and of bridge enabling a command to be transferred from an external peripheral device to an internal component of the peripheral device comprising the DMA type controller which thus simulates a behavior of a memory controller vis-à-vis the external peripheral device (steps 400 to 415).

As previously indicated, the DMA type controllers adapted to implement the invention may be used for collective transfers, that is to say multipoint data transfers.

FIG. 5 illustrates a computer system 500 adapted to implement direct data transfers in multipoint mode. The computer system 500 here comprises processors 505 and a central memory 510 linked by a system bus 515. The system 500 further comprises a bus switch 520 also linked to the system bus 515 as well as a plurality of peripheral devices 525-1 to 525-n.

The bus switch 520 is, for example, a PCI-E switch which is connected to the devices 525-1 to 525-n in point-to-point mode, independently, according to a full-duplex link, attributing bus widths according to the exchanges that are initiated by the DMA controllers of the peripheral devices.

It is noted here that in one specification the PCI-SIG standard provides for the possibility of making PCI-E exchanges of multicast type by implementing a suitable protocol in the DMA controller of a PCI-E switch to enable direct transfers of data between the central memory and peripheral devices grouped together in multicast group form.

There are for example PCI-E switches with 16 lanes comprising up to 4 DMA type controllers to perform direct data transfers according to descriptors that are specially dedicated to multicast exchange. These descriptors indicate a common source for each of the multicast type controllers which are aimed at different targets, thereby enabling multiple exchanges. These descriptors may also indicate whether interrupts have to be generated for each DMA type controller or only at the end of the multicast transfer.

Such switches may be used to implement the invention as described earlier and thus enable the direct transfer of data between peripheral devices grouped in multicast group form, each of those devices comprising a DMA type controller implementing the functions described earlier.

They thus enable data exchanges on the basis of collective transfer primitives, that is to say in a dialog with (n+1) participants.

Several operations are possible between peripheral devices provided with DMA type controllers in accordance with the specifications described previously and between peripheral devices provided with DMA type controllers in accordance with the specifications described previously and the central memory.

Examples of such operations are illustrated with reference to FIG. 6, comprising FIGS. 6a to 6g.

The peripheral devices 600-1 to 600-4 represented each comprise a DMA type controller in accordance with the specifications described previously. Each of these devices is linked here to a switch 605 adapted to manage the collective transfers (multicast and broadcast).

FIG. 6a illustrates multicast type sending from device 600-1 to devices 600-2 and 600-3. The dissemination of data is thus carried out from a source to several targets of the multicast group to which device 600-1 belongs. This is a communication of type 1 to n initiated by the device comprising the transferred item of data.

FIG. 6b illustrates broadcast type sending from device 600-1 to devices 600-2, 600-3 and 600-4. The dissemination of data is thus carried out from a source to all the targets of the multicast group to which device 600-1 belongs. This is a communication of type 1 to all initiated by the device comprising the transferred item of data.

FIG. 6c illustrates computed multicast type sending from device 600-1 to devices 600-2, 600-3 and 600-4. The dissemination of data is thus carried out from a source to all the targets of the multicast group to which device 600-1 belongs. Furthermore, an operation is carried out on the transferred data, for example a logic operation such as an "or", an "and" or an "exclusive or", a mathematical operation such as an addition or a multiplication or an operation defined by the device such as an operation of sorting or encrypting data. The operation carried out here is an addition between the transferred data and an item of data present in the target device. The sending is initiated by the device comprising the transferred item of data.

FIG. 6d illustrates data sending of aggregation type from devices 600-2 and 600-3 to device 600-1. This is an operation which, from several sources, makes it possible to send data to one or more targets by aggregating the data sent. The sending is initiated by the device receiving the transferred data.

FIG. 6e illustrates data sending of computed aggregation type from devices 600-2 and 600-3 to device 600-1. This is an operation which, from several sources, makes it possible to send data to a target by performing a computation on the data sent. This is an addition here between the data received from the sources used. The sending is initiated by the device receiving the transferred data. Naturally, other types of operations may be implemented.

FIG. 6f illustrates data sending of computed aggregation type from devices 600-2 and 600-3 and from the central memory 610 to device 600-1. This is an operation which, from several sources, makes it possible to send data to a target by performing a computation on the data sent. This is an addition here between the data received from the sources used. The sending is initiated by the device receiving the transferred data. Other types of operations may also be implemented.

FIG. 6g illustrates multicast type sending from device 600-1 to the devices 600-2 and 600-3 and the central memory 610. The dissemination of data is thus carried out from a source to several targets of the multicast group to which device 600-1 belongs. This is a communication of type 1 to n. The sending is initiated by the device comprising the transferred item of data.

It is thus in particular possible to perform the following operations at the time of the direct and collective sending of data, dissemination: data coming from a source are sent to several or to all the other peripheral devices belonging to the same group, and it is also possible for them to be sent to the central memory;

dissemination with operation: data coming from a source are sent to several or to all the other peripheral devices belonging to the same group and it is also possible for them to be sent to the central memory by performing operations on the those data, in particular logic type operations such as an "or" an "and" and an "exclusive or", mathematical operations such as additions and multiplications and operations defined by the target device or devices such as an operation of sorting or encryption of the data;

aggregation: data coming from several sources are aggregated and sent to one, several or all the other peripheral devices belonging to the same group, and it is also possible for them to be sent to the central memory; and aggregation with operations: operations are carried out on data coming from several sources, the results of these operations being sent to one, several or all the other peripheral devices belonging to the same group and it is also possible for them to be sent to the central memory. Such operations are in particular operations of logic type such as an "or", an "and" and an "exclusive or", mathematical operations such as additions and multiplications and operations defined by the target device or devices such as an operation of sorting or encryption of the data.

According to a particular embodiment, the choice of the operation to be carried out depends on some of the data received in response to a command for reading data.

Direct transfers of data between several peripheral devices, or collective transfers, may be implemented using primitives for collective transfers determined in at least one of the peripheral devices.

This implementation is similar to that described earlier. It comprises phases of identification, declaration, configuration and controlling. The parameters of the primitives for collective transfers are, preferably, similar to those of the primitives used for performing a direct transfer of data between memories of two peripheral devices as described earlier. However, they furthermore comprise specific features linked in particular to the operations of combining data.

An example of such a collective transfer primitive may be represented in the following form, read(source_1, destination_1, length_1, . . . , source_n, destination_n, length_n, parameters)

where, source_i and destination_i comprise the identifiers of the peripheral devices and memories considered as well as the memory areas concerned. According to the nature of the primitive, all the sources or all the destinations concern the same device and identical or distinct memory areas such that the same item of data can be transferred to several devices and such that data coming from different devices can be transferred into different memory areas of a device or into the same area after an operation has been carried out;

length_i indicates the quantity of data to transfer from the source_i to destination_i; and, parameters specify the parameters to be used that are linked, for example to security, to the checking of the data, to the operations to be carried out and to the execution of the command corresponding to the primitive.

When particular operations have to be carried out on transferred data, they are carried out by the device that initiated the command at step 425 illustrated in FIG. 4 or by a device that received the command at step 415 illustrated in FIG. 4 according to the information from the primitive at the origin of the direct access command.

Thus, for example, with reference to FIG. 6e, after having initiated a command to access data stored in devices 600-2 and 600-3, the device 600-1 waits to receive the transferred data then carries out the operation specified in the primitive.

Step 425 described earlier then comprises a step for initiating the command for direct access to the memory of other devices, a synchronizing step to obtain the awaited data and a step directed to the execution of the operations specified in the primitive linked to the activated transfer.

Similarly, with reference, for example, to FIG. 6c, when a direct access command is initiated according to a primitive indicating the execution of an operation in another device, distinct from the device at the origin of that command, an indication relative to the operations to perform is added to the direct access command sent to that other device. When such a command is received by a DMA type controller and is valid, the operations to perform are identified by the DMA according to the indications received. It then initiates their execution before sending the command in order for it to be executed during step 415.

Naturally, to satisfy specific needs, a person skilled in the art will be able to make amendments to the preceding description.

The invention claimed is:

1. A controller configured to control direct access to or from a memory for a first peripheral device, wherein the first peripheral device is configured to be connected to at least one second peripheral device via a communication bus, the controller comprising:
a memory; and
a processing unit in communication with the memory, wherein the processing unit is configured to:
register the first peripheral device and describe its type so as to be identifiable by the second peripheral device and so as to identify the second peripheral device;
initiate a command for direct access to an area of a memory external to the first peripheral device;
receive at least one command for direct access to an area of a memory of the first peripheral device, the received command being received from the second peripheral device;
send the received command to a component of the first peripheral device; and
enable a controller for direct access to a memory of the second peripheral device to perform a direct transfer of data to or from the area of the memory of the first peripheral device from or to the memory of the second peripheral device.

2. The controller according to claim 1, wherein the processing unit is configured to check the validity of the received command.

3. The controller according claim 2, wherein to check the validity of the received command, the processing unit is configured to compare an identifier of the sender of the received command with at least one predetermined identifier.

4. The controller according to claim 2, wherein to check the validity of the received command, the processing unit is configured to compare the memory of the second peripheral device with at least one predetermined memory area.

5. The controller claim 1, the processing unit is configured to identify the second peripheral device and to send a command for direct access to an area of memory of the second peripheral device.

6. A controller for direct access to a memory for a first peripheral device it being possible for said first peripheral device to be connected to at least one second peripheral device via a communication bus, the controller comprising:
means for registering the first peripheral device and describe its type so as to be identifiable by the second peripheral device and so as to identify the second peripheral device;
means for initiating at least one command for direct access to an area of a memory external to said first peripheral device;
means for receiving at least one command for direct access to an area of a memory of said first peripheral device, said command being received from said at least one second peripheral device; and,
means for sending said at least one received direct access command to a component of said first peripheral device,
said controller enabling a controller for direct access to a memory of said at least one second peripheral device to perform a direct transfer of at least one item of data to or from a memory of said first peripheral device from or to said at least one second peripheral device.

7. The controller according to claim 6, further comprising means for checking the validity of said at least one received direct access command.

8. The controller according to claim 6, further comprising means for identifying said at least one second peripheral device and means for sending a command for direct access to an area of said second device when the memory concerned by the direct access command coming from said initiating means belong to said at least one second peripheral device.

* * * * *